United States Patent [19]

Wulf et al.

[11] 3,944,250
[45] Mar. 16, 1976

[54] AUTOMATICALLY INFLATABLE GAS CUSHION FOR THE PROTECTION OF THE PASSENGERS OF VEHICLES

[75] Inventors: Helmut Wulf, Nellingen; Gerhard Schiesterl, Etting, both of Germany

[73] Assignee: Daimler-Benz Aktiengesellschaft, Germany

[22] Filed: Dec. 1, 1972

[21] Appl. No.: 311,213

[30] Foreign Application Priority Data
Dec. 3, 1971    Germany............................ 2159947
Dec. 17, 1971   Germany............................ 2162687

[52] U.S. Cl.......................... 280/150 AB; 280/87 R
[51] Int. Cl.²......................................... B60R 21/10
[58] Field of Search................... 280/150 AB, 87 R; 116/DIG. 9; 244/31; 9/9

[56] References Cited
UNITED STATES PATENTS

| | | | |
|---|---|---|---|
| 3,588,142 | 6/1971 | Gorman | 280/150 AB |
| 3,632,136 | 1/1972 | Foltz | 280/150 AB |
| 3,643,971 | 2/1972 | Kushnick | 280/150 AB |
| 3,657,752 | 4/1972 | Davidson | 9/9 |
| 3,764,160 | 10/1973 | Fiala | 280/150 AB |
| 3,822,894 | 7/1974 | Muller et al. | 280/150 AB |

FOREIGN PATENTS OR APPLICATIONS

| | | | |
|---|---|---|---|
| 609,624 | 9/1960 | Italy | 280/150 AB |
| 896,312 | 11/1953 | Germany | 280/150 AB |

*Primary Examiner*—Kenneth H. Betts
*Attorney, Agent, or Firm*—Craig & Antonelli

[57] ABSTRACT

A gas cushion for the protection of the passengers of vehicles, especially of motor vehicles, which is automatically inflatable upon exceeding a predetermined deceleration of the vehicle by means of a gas generator; the gas cushion is accommodated in a hollow space, for example, of the steering wheel or of the instrument panel opposite the passengers whereby the hollow space is closed off by a cover which is adapted to be pushed out when the gas cushion is set into operation; means are thereby provided which open the cover independently of the inflating gas cushion as a function of the response of a sensor serving to set the gas generator into operation.

22 Claims, 3 Drawing Figures

AUTOMATICALLY INFLATABLE GAS CUSHION FOR THE PROTECTION OF THE PASSENGERS OF VEHICLES

The present invention relates to an automatically inflatable gas cushion for the protection of the passengers of vehicles, especially of motor vehicles, automatically inflatable upon exceeding a predetermined deceleration of the vehicle by means of a gas generator or the like, which gas cushion is stored or accommodated in a hollow space, for example, of the steering wheel or of the instrument panel, facing the passengers, whereby this hollow space is closed off by a cover or lid that is adapted to be pushed out of a mounting, when putting the gas cushion into operation.

Practical tests with such gas cushions have demonstrated that very precise and definite requirements have to be made of the cover or lid, which closes off the space in which the folded-together gas cushion is accommodated, in order to assure a completely satisfactory functioning of the gas cushion in case of emergency.

Thus, the cover or lid should have as low as possible a weight and should be easily openable since with the extraordinarily high gas velocities occurring during the inflation of a gas cushion otherwise an excessively strong delay would occur in the first phase of the inflation operation. This, however, would have two undesirable consequences. On the one hand, with a delayed inflation the gas cushion may be damaged by the very hot gases and, on the other, a considerably increased and reinforced bang would occur which might lead to damaging the hearing of the vehicle passengers.

However, it has been discovered that also when both of the aforementioned requirements are fulfilled, an opening of the cover alone by the inflating or filling gas cushion is not sufficient in all cases in order to enable a completely satisfactory movement progress of the unfolding gas cushion.

The present invention is therefore concerned with the task to provide an installation which assures a timely opening of the cover or lid under all circumstances.

Consequently, in one embodiment a gas cushion of the aforementioned type is proposed whereby according to the present invention at least one explosive charge separate from the gas generator of the system is provided for pushing out the cover, which is triggered at the latest together with the gas generator.

Movie pictures of corresponding tests have indicated that the gas generator serving for the filling of the gas cushion requires a relatively long period of time, for example, of the order of magnitude of 10 msec until the gas generation starts to function fully. During this time, a small explosive charge could have burned out already so that the cover is already opened when the unfolding of the gas cushion commences.

In one preferred embodiment of the present invention, the explosive charge is accommodated in a pipe or tubular member open on one side whose closed end is secured at the cover or lid and whose open end is directed away from the passengers.

According to another preferred embodiment of the present invention, a gas cushion of the aforementioned type is proposed, whereby according to the present invention the gas generator is so mounted and supported that after being put into operation—driven by the energy of the then-forming or released gases—it can carry out a movement in the direction toward the cover or lid, and that means are provided which transmit this movement to the cover and thereby open the same.

Advantageously, the gas generator is thereby displaceable against the action of a spring which subsequently returns the gas generator again into its original position.

In a gas cushion in which a mounting frame is provided at which are secured a container accommodating the folded-together gas cushion and consisting, for example, of wire mesh as well as the open end of the gas cushion itself, it may be of advantage if the container and the mounting frame are utilized for the transmission of the movement of the gas generator to the cover.

However, according to a further feature of the present invention, also separate transmission elements, for example, in the form of rods which are relatively thin but sufficiently stiff or rigid against bending or buckling may be provided for the transmission of the movement of the gas generator to the cover.

Accordingly, it is an object of the present invention to provide an automatically inflatable gas cushion for the protection of the passengers of vehicles, especially of motor vehicles, which avoids by simple means the aforementioned shortcomings and drawbacks encountered in the prior art.

Another object of the present invention resides in an automatically inflatable gas cushion for the protection of passengers of vehicles which assures a timely opening of the cover under all circumstances.

A further object of the present invention resides in an automatically inflatable gas cushion for the protection of passengers of motor vehicles which assures a completely satisfactory progress of the movement of the unfolding gas cushion in case of an accident.

A still further object of the present invention resides in an automatically inflatable gas cushion of the aforementioned type which assures a timely opening of the cover or lid under all circumstances.

These and other objects, features and advantages of the present invention will become more apparent from the following description when taken in connection with the accompanying drawing which shows, for purposes of illustration only, three embodiments in accordance with the present invention, and wherein.

Figure 1:
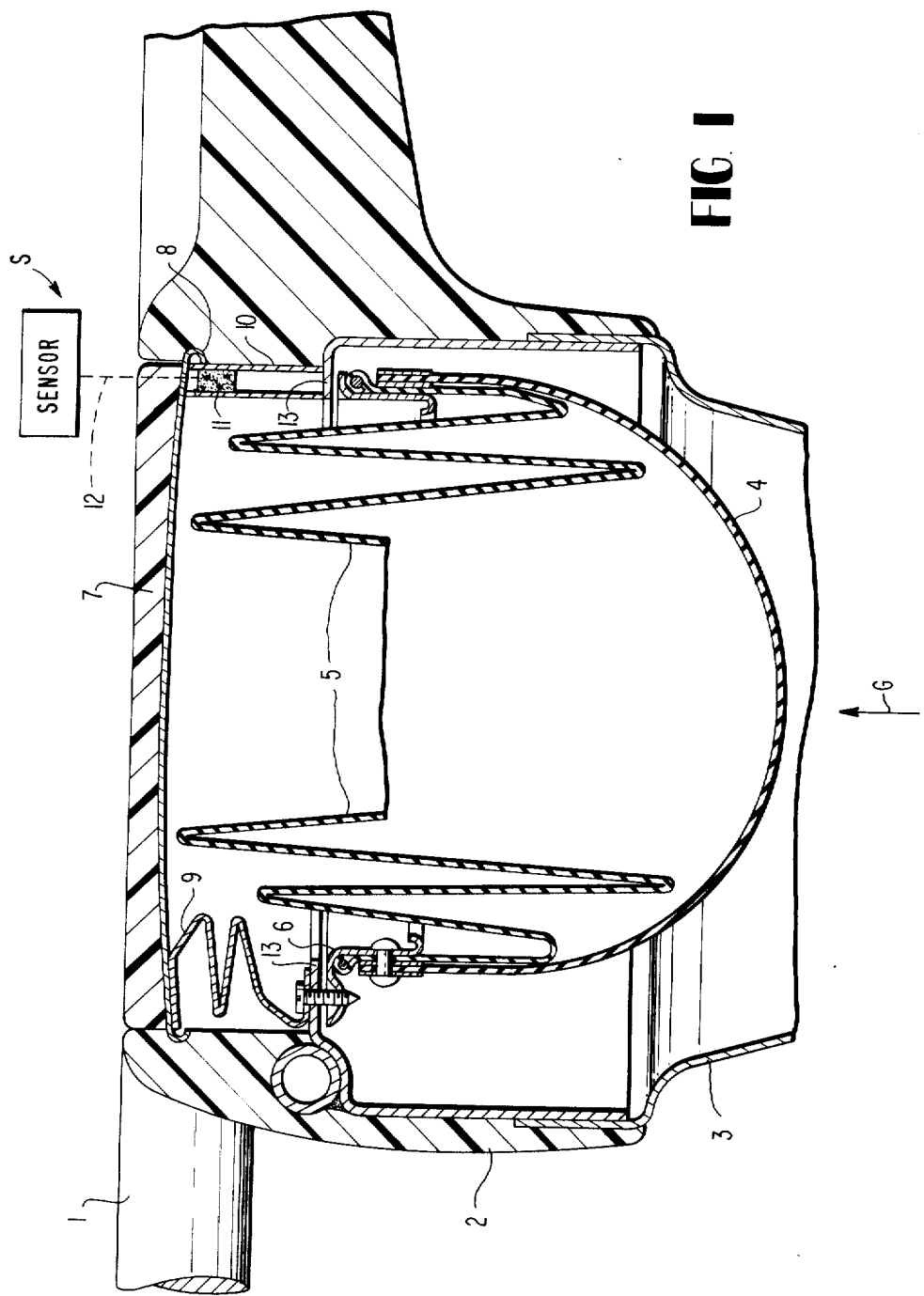
FIG. 1 is a partial cross-sectional view through one embodiment of an automatically inflatable gas cushion in accordance with the present invention.

Referring now to the drawing wherein like reference numerals are used throughout the two views to designate like parts, and more particularly to FIG. 1, in the safety steering device illustrated in this figure, reference numeral 1 designates therein a steering wheel. A deformation member 3 consisting of sheet metal which is surrounded in part by a foamed material layer or element 2 is arranged adjoining the steering wheel 1 in the safety steering device of this figure. The layer 2 consisting of conventional synthetic plastic material, such as synthetic resinous material, is thereby foamed about the deformation member 3. A container 4 consisting, for example, of wire mesh is provided on the inside of the deformation member 3, in which is accommodated a folded-together gas cushion 5 that is connected with the steering wheel 1 by way of a mounting frame 6. A conventional gas generator (not shown) may serve for filling the gas cushion 5 which, in case of emergency, produces a gas that flows into the gas cushion in the direction of the arrow "G".

A cover or lid 7 forms the upper closure of the space serving for the accommodation of the folded-together gas cushion 5; the cover 7 is retained in a circumferential groove 8 provided in the foamed-about member 2. The cover 7 is pivotally connected by way of a band 9 consisting, for example, of a fabric that is secured at a flange 13 and forms a practically frictionlessly operating joint.

A small explosive charge 11 is arranged in a tubular member or pipe 10 opposite the joint constituted by the band 9; the explosive charge 11 is connected by way of a cable 12 in a manner not illustrated in detail with a conventional sensor S responding to a predetermined vehicle deceleration.

At its upper closed end, the pipe 10 is secured at the cover 7 whereas at its lower open end it rests loosely on the flange 13.

During the ignition of the explosive charge 11 operating according to the reaction principle, the cover 7 is pushed out of the groove 8 and is pivoted away so that it cannot prevent the unfolding of the gas cushion 5.

Figure 2:
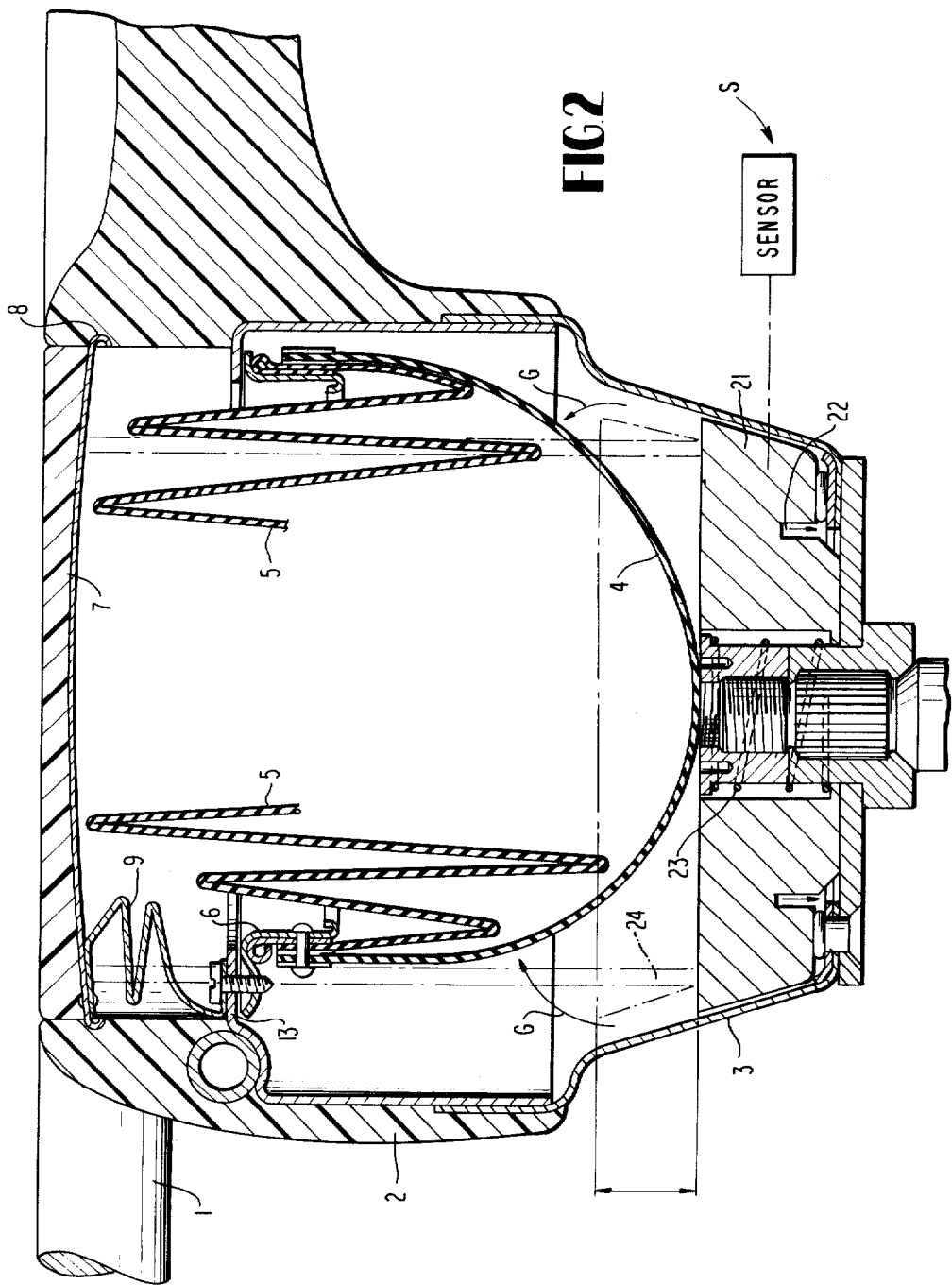
FIG. 2 is a partial cross-sectional view through a modified embodiment of an automatically inflatable gas cushion in accordance with the present invention.

In the embodiment of the safety steering device in FIG. 2, a deformation member 3 consisting again of sheet metal and surrounded in part again by a foamed-about member 2 of conventional synthetic plastic foamed material, again adjoins the steering wheel 1. A container 4 is provided on the inside of the deformation member 3 which consists, for example, of wire mesh and in which is accommodated a folded-together gas cushion 5 that is connected with the steering wheel 1 by way of a mounting frame 6.

A cover or lid 7 again forms the upper closure of the space serving for the accommodation of the folded-together gas cushion 5; the cover 7 is held in a circumferential groove 8 provided in the foamed-about member 2. The cover 7 is pivotally connected by means of a band 9 consisting, for example, of fabric which is secured at a flange 13 and again forms a practically frictionlessly operating joint.

A gas generator 21 serves for the filling of the gas cushion 5 in case of the emergency, which is connected with a conventional sensor S responding to a predetermined vehicle deceleration in a manner not illustrated in detail and is ignited thereby. When the gas generator 21 is in operation, the formed or developed gases flow into the gas cushion 5 in the direction of the arrows "G". Due to the outflowing gases which flow out from the side of the gas generator 21 opposite the gas cushion 5 by way of discharge apertures 22, the gas generator 21 is initially lifted against the force of the compression spring 23 by the distance "S". This movement is transmitted to the cover 7 by way of thin rods 24 which are relatively bending or buckling resistant. However, in the dimensioning of the rods 24, due consideration must also be given to the fact that the buckling resistance or stiffness thereof must not be so large that the compression of the deformation member 3 is prevented thereby in case of an impact of the driver against the steering wheel.

Figure 3:
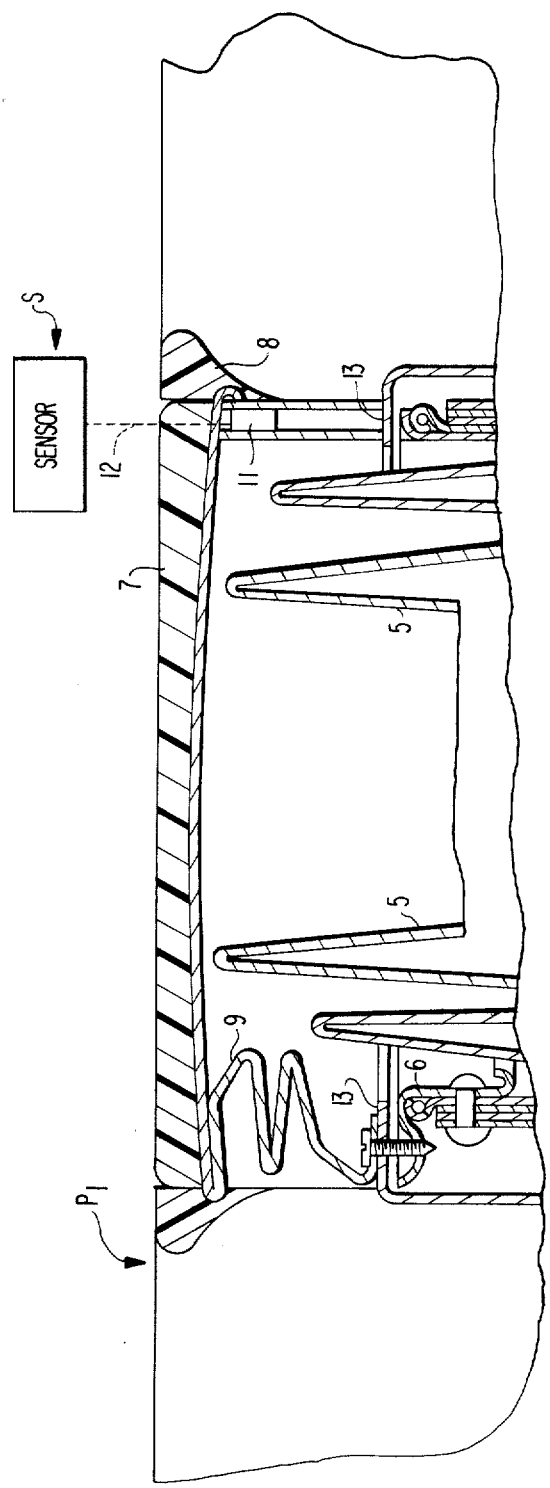
FIG. 3 is a partial cross-sectional view through a further embodiment of an automatically inflatable gas cushion in accordance with the present invention.

In the embodiment of FIG. 3, the gas cushion 5 is disposed in a hollow space provided in an instrument panel P of the motor vehicle with a cover or lid 7 forming the upper closure of the hollow space. As with the embodiment of FIG. 1, one end of the cover 7 is held in a circumferential groove 8 formed in the foamed material of the instrument panel P and the other end of the cover 7 is pivotally connected by a band 9 which is secured at flange 13 to form a pratically frictionless operating joint.

As also with the embodiment of FIG. 1, the embodiment of FIG. 3 includes a small explosive charge 11 which is arranged in a tubular member or pipe 10 opposite the joint constituted by the band 9 with the explosive charge being connected by way of a cable 12 with a conventional sensor S responding to a predetermined vehicle deceleration.

While we have shown and described only three embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A gas cushion for the protection of passengers of vehicles, expecially of motor vehicles which is automatically inflatable upon exceeding a predetermined deceleration of the vehicle and which is accommodated in a hollow space means disposed opposite the passengers, said hollow space means being closed off by a cover means adapted to be pushed out of a retaining means when the gas cushion is set into operation, characterized in that cover-displacing means are provided for displacing the cover means away from said hollow space means independently of the inflating gas cushion means.

2. A gas cushion automatically inflatable by a gas generator means according to claim 1, characterized in that the cover-displacing means are operable in dependence on the response of a sensor means serving the purpose of setting the gas generator means into operation.

3. A gas cushion according to claim 2, characterized in that said cover-displacing means includes at least one explosive charge separate from the gas generator means which is triggered at the latest together with the gas generator means.

4. A gas cushion for the protection of passengers of vehicles, especially of motor vehicles, which is automatically inflatable upon exceeding a predetermined deceleration of the vehicle and which is accommodated in a hollow space means disposed opposite the passengers, said hollow space means being closed off by a cover means adapted to be pushed out of a retaining means when the gas cushion is set into operation, characterized in that cover-opening means are provided for opening the cover means independently of the inflating gas cushion means, the cover opening means are operable in dependence on the response of a sensor means serving the purpose of setting the gas generator means into operation, said cover-opening means includes at least one explosive charge separate from the gas generator means which is triggered at the latest together with the gas generator means, and in that a pipe having an open and closed end is provided, the explosive charge is accommodated in the pipe, the closed end of said pipe is secured at the cover means and the open end of said pipe is directed away from the passengers and is supported at a fixed vehicle part.

5. A gas cushion according to claim 4, characterized in that said fixed vehicle part is a flange provided at a mounting means for the gas cushion.

6. A gas cushion according to claim 2, characterized in that said cover displacing means is operable to cause the gas generator means, upon being set into operation, to move in the direction toward the cover means driven by the energy of the then-forming gases, and means for transmitting the movement of the gas generator means to the cover means and thereby open the latter.

7. A gas cushion according to claim 6, characterized in that the gas generator means is so supported that it is able to carry out the movement in the direction of the cover means upon initiation of its operation.

8. A gas cushion according to claim 7, characterized in that the gas cushion means is displaceable against the action of a spring means.

9. A gas cushion according to claim 8, in which a mounting frame means is provided, at which are secured a container means accommodating the folded-together gas cushion as well as the open end of the gas cushion itself, characterized in that the container means and the mounting frame means are used for the transmission of the movement of the gas generator means to the cover means.

10. A gas cushion according to claim 9, characterized in that the container means consists of a wire mesh.

11. A gas cushion according to claim 8, characterized in that separate transmission elements are provided for transmitting the movement of the gas generator means to the cover means.

12. A gas cushion according to claim 11, characterized in that the separate transmission elements are in the form of thin rods having a sufficient buckling rigidity.

13. A gas cushion according to claim 6, in which a mounting frame means is provided, at which are secured a container means accommodating the folded-together gas cushion as well as the open end of the gas cushion itself, characterized in that the container means and the mounting frame means are used for the transmission of the movement of the gas generator means to the cover means.

14. A gas cushion according to claim 6, characterized in that separate transmission elements are provided for transmitting the movement of the gas generator means to the cover means.

15. A gas cushion according to claim 14, characterized in that the separate transmission elements are in the form of thin rods having a sufficient buckling rigidity.

16. A gas cushion according to claim 1, characterized in that the hollow space means is provided at a steering wheel.

17. A gas cushion according to claim 1, characterized in that the hollow space means is provided in an instrument panel of the vehicle.

18. A gas cushion arrangement comprising: an inflatable gas cushion means, means for selectively inflating said gas cushion means, housing means for accommodating said gas cushion means in a deflated condition, cover means for covering said housing means with said gas cushion means in the deflated condition, and means for displacing said cover means away from said housing means independently of the inflating gas cushion means by said inflating means.

19. An arrangement according to claim 18, wherein a substantially frictionless pivot means is provided on a portion of said housing means for pivoting said cover means away from said housing means.

20. An arrangement according to claim 19, wherein said means for displacing said cover means includes an explosive charge means directly acting upon said cover means.

21. An arrangement according to claim 20, wherein a means disposed between said cover means and a portion of said housing means is provided for accommodating said explosive charge means.

22. An arrangement according to claim 21, wherein said means for accommodating said explosive charge means includes a first portion secured to said cover means and a second portion resting loosely on the portion of said housing means.

* * * * *